US006969319B2

(12) United States Patent
Rowe et al.

(10) Patent No.: US 6,969,319 B2
(45) Date of Patent: Nov. 29, 2005

(54) GAME ORIENTED PROMOTIONAL CARD

(75) Inventors: Richard E. Rowe, Reno, NV (US); Michael M. Oberberger, Reno, NV (US)

(73) Assignee: IGT, Reno, NV (US)

( * ) Notice: Subject to any disclaimer, the term of this patent is extended or adjusted under 35 U.S.C. 154(b) by 316 days.

(21) Appl. No.: 09/924,250

(22) Filed: Aug. 7, 2001

(65) Prior Publication Data

US 2003/0032473 A1 Feb. 13, 2003

(51) Int. Cl.$^7$ .................................................. A63F 13/10
(52) U.S. Cl. ...................................... 463/25; 463/29
(58) Field of Search .............................. 463/1, 12–13, 463/16, 20, 25, 29, 36, 40–43; 273/138.1, 139; 703/1, 14, 17–18

(56) References Cited

U.S. PATENT DOCUMENTS

| 4,764,666 | A | * | 8/1988 | Bergeron ...................... 463/25 |
| 5,080,364 | A | * | 1/1992 | Seidman ...................... 463/25 |
| 5,326,104 | A | * | 7/1994 | Pease et al. ................... 463/25 |
| 5,643,086 | A | | 7/1997 | Alcorn et al. ................. 463/29 |
| 5,761,647 | A | | 6/1998 | Boushy ........................ 705/10 |
| 5,768,382 | A | | 6/1998 | Schneier et al. .............. 380/23 |
| 5,871,398 | A | | 2/1999 | Schneier et al. .............. 463/16 |
| 5,967,896 | A | | 10/1999 | Jorasch et al. ................ 463/25 |
| 6,019,283 | A | | 2/2000 | Lucero ........................ 235/380 |
| 6,104,815 | A | | 8/2000 | Alcorn et al. ............... 380/251 |
| 6,106,396 | A | | 8/2000 | Alcorn et al. ................. 463/29 |
| 6,110,044 | A | * | 8/2000 | Stern .......................... 463/29 |
| 6,113,098 | A | | 9/2000 | Adams ...................... 273/143 R |
| 6,149,522 | A | | 11/2000 | Alcorn et al. ................. 463/29 |
| 6,227,972 | B1 | * | 5/2001 | Walker et al. ................. 463/25 |
| 6,500,067 | B1 | * | 12/2002 | Luciano et al. ............... 463/25 |
| 6,511,377 | B1 | * | 1/2003 | Weiss .......................... 463/25 |
| 6,547,664 | B2 | * | 4/2003 | Saunders ..................... 463/25 |
| 2002/0047044 | A1 | | 4/2002 | Orus et al. |
| 2003/0031321 | A1 | | 2/2003 | Mages |

FOREIGN PATENT DOCUMENTS

| EP | 0 3690 613 | 9/1989 | |
| EP | 0 805 424 A2 | 5/1997 | .......... G07F/17/32 |
| EP | 1 094 425 A2 | 4/2001 | .......... G07F/17/32 |
| EP | 1 139 310 A2 | 4/2001 | .......... G07F/17/32 |
| GB | 2 241 098 A | 8/1991 | .......... G07F/7/08 |
| GB | 2 296 361 A | 6/1996 | .......... G07F/7/08 |
| GB | 2 374 191 A | 10/2002 | .......... G07F/17/34 |
| WO | WO 94/16781 | 8/1994 | .......... A63B/71/06 |
| WO | WO 95/10824 | 4/1995 | |
| WO | WO 95/24689 | 9/1995 | |
| WO | WO 96/00950 | 1/1996 | |
| WO | WO 02/23491 A2 | 3/2002 | .......... G07D/1/00 |
| WO | WO 02/23496 A2 | 3/2002 | .......... G07F/17/32 |
| WO | WO 02/41963 A2 | 5/2002 | |
| WO | WO 03/015299 | 2/2003 | |

* cited by examiner

*Primary Examiner*—Derris H. Banks
*Assistant Examiner*—Robert Mosser
(74) *Attorney, Agent, or Firm*—Beyer Weaver & Thomas LLP

(57) ABSTRACT

A promotional device and methods for using such a device are described. The promotional device has indicia of credit associated therewith for effecting operation of a specific gaming application on a gaming machine which is in communication with the promotional device. The promotional device identifies the specific gaming application and limits use of the credit thereto.

37 Claims, 4 Drawing Sheets

GAME ORIENTED PROMOTIONAL CARD

BACKGROUND OF THE INVENTION

This invention relates to gaming network including gaming machines such as video slot machines and video poker machines. More specifically, the present invention provides methods and apparatus for promoting use of a particular gaming machine or set of gaming machines. Still more specifically, mechanisms are provided by which game-specific credits may be distributed.

Traditionally, promotional cards with stored gaming credits have been provided to visitors in a gaming venue such as a casino for the purpose of promoting play across the spectrum of gaming machines at the venue. That is, the visitor, who might be, for example, a frequent customer, might be given such a promotional card as a reward for the visitor's past patronage and as an inducement for continued patronage. The visitor can then use the card and its credits in any gaming machine of her choosing.

While this mechanism may be useful for generating customer loyalty to a particular venue or chain of venues, it has not been effective for precisely directing customer behavior with respect to specific gaming machines or groups of gaming machines. Instead, if a casino or gaming machine manufacturer wanted to encourage customers to play to a new game, only standard marketing mechanisms, e.g., signage, advertising, have typically been employed. As will be understood, the fact that conventional promotional cards allow the customer to play any of the available gaming machines at a gaming establishment makes such cards ill-suited for promoting play of a specific gaming machine.

It is therefore desirable to provide a mechanism by which use of a specific gaming machine or group of gaming machines may be promoted.

SUMMARY OF THE INVENTION

According to the present invention, mechanisms are provided by which the use of a particular gaming machine or group of gaming machines may be promoted. That is, specific embodiments of the present invention enable the distribution and use of game-specific credits. More specifically, the present invention provides promotional devices and methods for using such a devices. The promotional device has indicia of credit associated therewith for effecting operation of at least one specific gaming application on a gaming machine which is in communication with the promotional device. The promotional device identifies the at least one specific gaming application and limits use of the credit thereto.

A further understanding of the nature and advantages of the present invention may be realized by reference to the remaining portions of the specification and the drawings.

DETAILED DESCRIPTION OF SPECIFIC EMBODIMENTS

Figure 1:
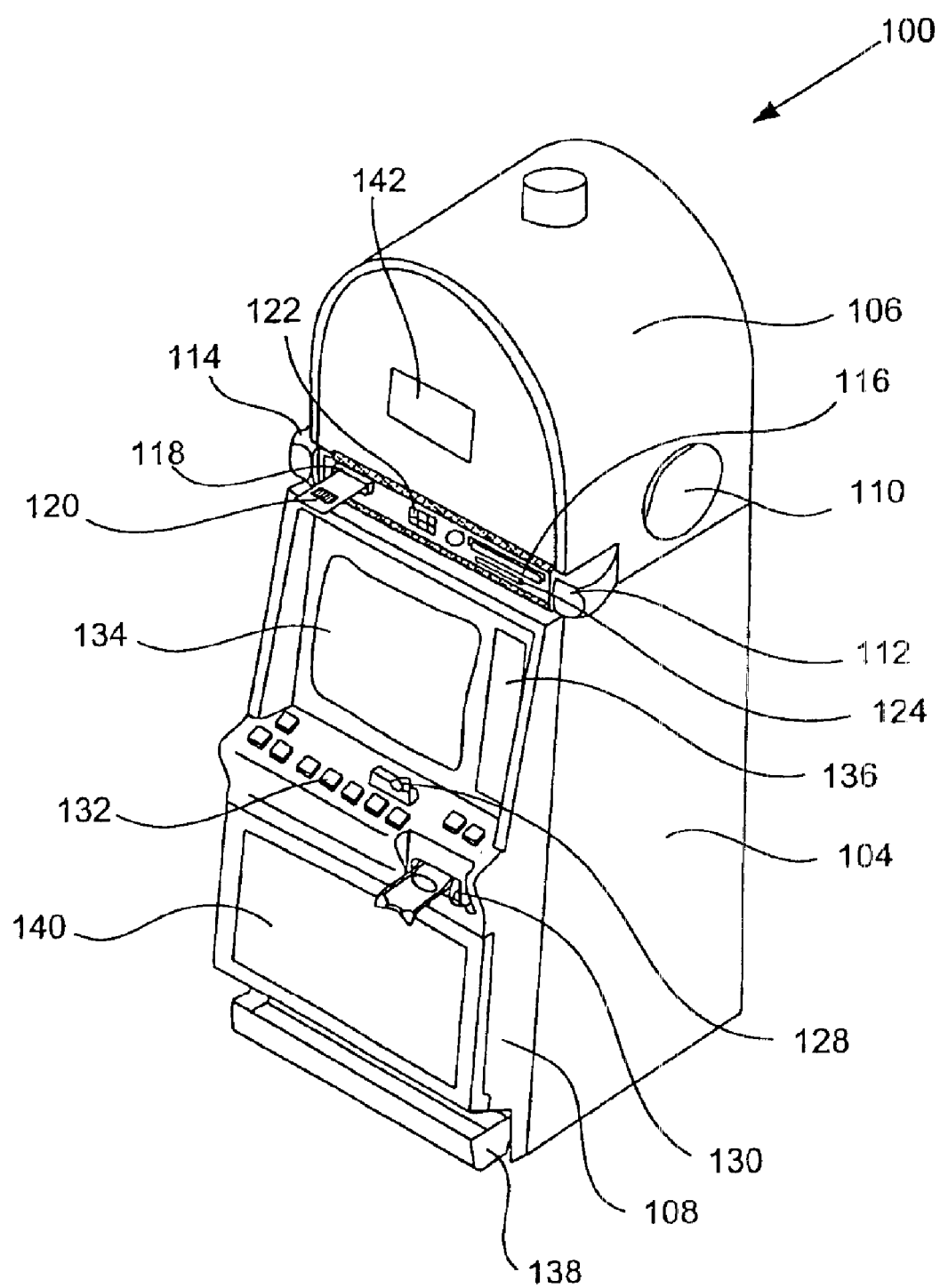
FIG. 1 is a perspective view of a gaming machine for use with specific embodiments of the present invention.

Turning first to FIG. 1, a video gaming machine 100 will be described with which various embodiments of the present invention may be practiced. Machine 100 includes a main cabinet 104, which generally surrounds the machine interior (not shown) and is viewable by users. The main cabinet includes a main door 108 on the front of the machine, which opens to provide access to the interior of the machine. Attached to the main door are player-input switches or buttons 132, a coin acceptor 128, and a bill validator 130, a coin tray 138, and a belly glass 140. Viewable through the main door is a video display monitor 134 and an information panel 136. The display monitor 134 will typically be a cathode ray tube, high resolution flat-panel LCD, or other conventional electronically controlled video monitor. The information panel 136 may be a back-lit, silk screened glass panel with lettering to indicate general game information including, for example, the number of coins played. The bill validator 130, player-input switches 132, video display monitor 134, and information panel are devices used to play a game on the game machine 102. The devices are controlled by circuitry (not shown) housed inside the main cabinet 104 of the machine 100. Many possible games, including traditional slot games, video slot games, video poker, and video keno, may be provided.

The gaming machine 100 includes a top box 106, which sits on top of the main cabinet 104. The top box 106 houses a number of devices, which may be used to add features to a game being played on the gaming machine 100, including speakers 110, 112, 114, a ticket printer 118 which may print bar-coded tickets 120, a key pad 122 for entering player tracking information, a florescent display 116 for displaying player tracking information, a card reader 124 for entering a magnetic striped card containing player tracking information. Further, the top box 106 may house different or additional devices than shown in FIG. 1. For example, the top box may contain a bonus wheel or a back-lit silk screened panel which may be used to add bonus features to the game being played on the gaming machine. During a game, these devices are controlled and powered, in part, by circuitry (not shown) housed within the main cabinet 104 of the machine 100.

Understand that gaming machine 100 is but one example from a wide range of gaming machine designs on which the present invention may be implemented. For example, not all suitable gaming machines have top boxes or player tracking features. Further, some gaming machines have two or more game displays—mechanical and/or video. And, some gaming machines are designed for bar tables and have displays that face upwards. Still further, some machines may be designed entirely for cashless systems. Such machines may not include such features as bill validators, coin acceptors and coin trays. Instead, they may have only ticket readers, card readers and ticket dispensers. Those of skill in the art will understand that the present invention, as described below, can be deployed on most any gaming machine now available or hereafter developed.

When a user wishes to play the gaming machine 100, he or she inserts cash through the coin acceptor 128 or bill validator 130. In addition, the player may use a cashless instrument of some type to register credits on the gaming machine 100. For example, the bill validator 130 may accept a printed ticket voucher, including 120, as an indicia of credit. As another example, the card reader 124 may accept a debit card or a smart card containing cash or credit information that may be used to register credits on the gaming machine. Typically, the information contained on the cashless instrument, including the ticket voucher, smart card or debit card, is validated by a cashless system. The cashless instrument, including the ticket voucher, smart card or debit card, may have been generated at the same property, for example a first casino where the gaming machine 100 is located or the ticket may have been generated at another property for example a second casino.

The cashless instrument typically contains information used to register credits on the gaming machine, including gaming machine 100, and validate the registration transaction. For example, when a ticket voucher is used as a cashless instrument, the printed ticket voucher may contain information including: 1) a ticket value, 2) a ticket issue date, 3) a ticket issue time, 4) a ticket transaction number, 5) a machine ID, 6) a ticket issue location and 7) a ticket owner. Information such as the ticket value, the ticket issue date, the ticket issue time, the ticket number and the machine ID may be common to cashless systems that generate and validate tickets issued at a single property. However, information such as the ticket issue location and the ticket owner may be needed to allow multi-site generation and validation of cashless instruments. In addition, other types of information, besides the information listed above, may be stored on the cashless instrument. For example, the ticket may contain information regarding a promotional prize that may be won by the player when the ticket voucher is utilized in the gaming machine 100. The promotional prize may involve multiple properties and particular types of gaming machines.

The information on the cashless instrument may be recorded on the cashless instrument when the cashless instrument is generated. For example, in the case of the ticket voucher, the generation of the ticket voucher may refer to the actual printing of the ticket voucher on paper or some other medium. A unique bar-code may be printed on the ticket voucher which may be read with a bar-code scanner to obtain information from the ticket. The ticket voucher, including 120, may be printed from a printer, including printer 118. In the case of the smart card or debit card, the generation of the smart card or debit card refers to storing or encoding this information on the smart card or debit card. The generation of the debit card or smart card may occur when the smart card or debit card is inserted into the card reader 124 in the gaming machine 100 or at another site where smart cards or debit cards are issued. For example, smart cards or debit cards may be generated at ATM like terminals, at a cashier station when a player cashes out or prepaid smart cards or debits may be purchased within the gaming property (e.g. casino).

During the course of a game, a player may be required to make a number of decisions, which affect the outcome of the game. For example, a player may vary his or her wager on a particular game, select a prize for a particular game, or make game decisions which affect the outcome of a particular game. The player may make these choices using the player-input switches 132, the video display screen 134 or using some other device which enables a player to input information into the gaming machine. During certain game events, the gaming machine 100 may display visual and auditory effects that can be perceived by the player. These effects add to the excitement of a game, which makes a player more likely to continue playing. Auditory effects include various sounds that are projected by the speakers 110, 112, 114. Visual effects include flashing lights, strobing lights or other patterns displayed from lights on the gaming machine 100 or from lights behind the belly glass 140.

After the player has completed a game, a cashless instrument may be generated at the gaming machine 100. The cashless instrument may be a printed ticket voucher, a smart card, debit card or other cashless medium. For example, the player may decide to cashout and may receive the ticket 120 from the printer 118, which may be used for further games or to redeem a prize. Further, the player may receive a ticket 120 for food, merchandise, game services or other promotions from the printer 118 that may be used at the gaming property where the gaming machine is located or at other gaming properties. The player may view cashless instrument transaction information on the video display screen 134 or the florescent screen 116. For instance, when a player cashes out from the gaming machine, the value stored on the cashless instrument may be displayed using the video display 134. As another example, when a promotion ticket 120 is printed out from the printer 118 that is valid at a number of other gaming properties, a map may be displayed on the video display screen indicating where the other gaming properties are located.

As will become clear, any of the cashless instruments or mechanisms described herein may be used to facilitate the various embodiments of the invention by which game-specific credits are distributed and used.

Figure 2:
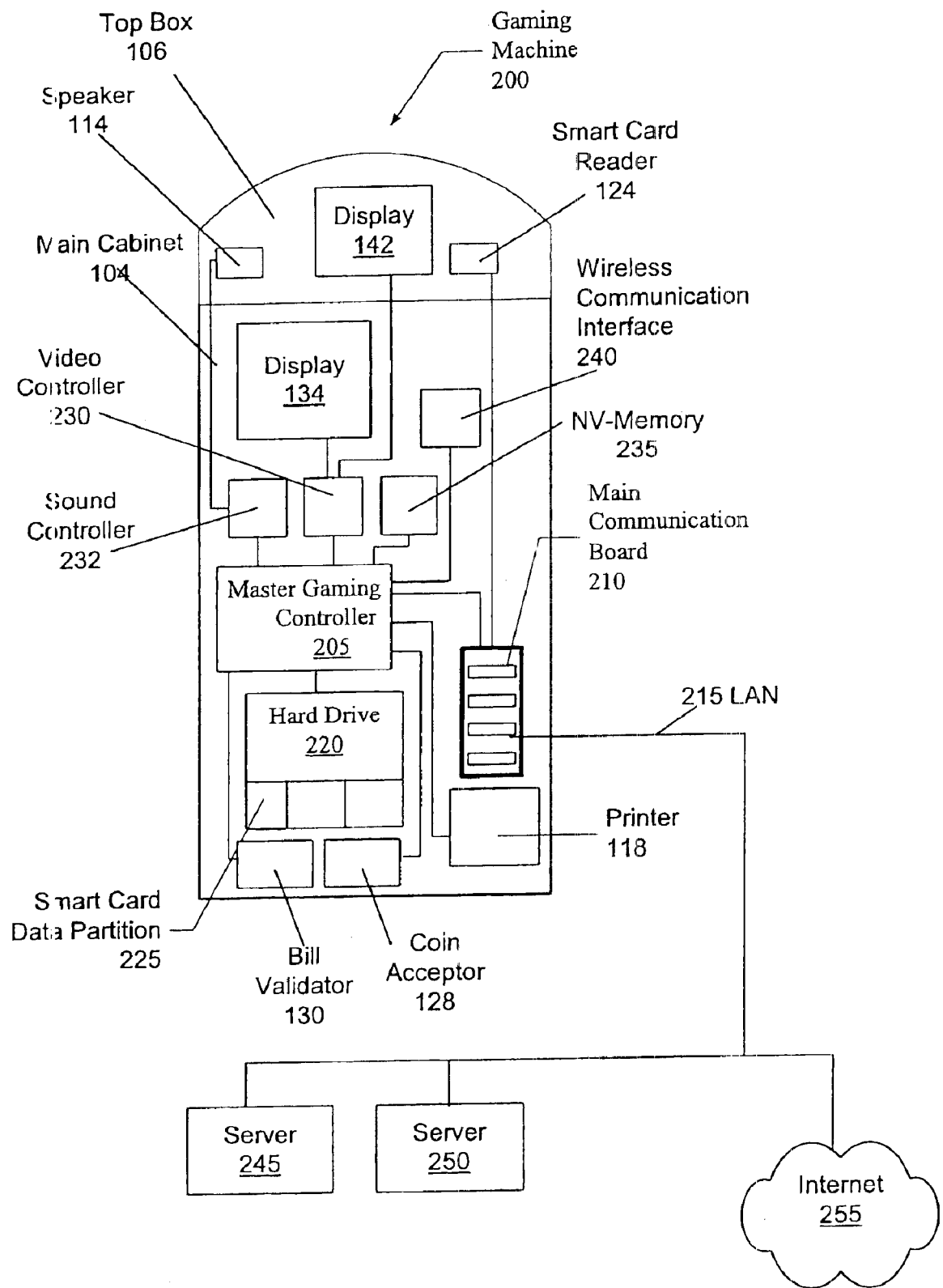
FIG. 2 is a simplified block diagram of a gaming machine and gaming network in which various embodiments of the present invention may be implemented.

FIG. 2 includes a block diagram of the components of a gaming machine 200 for use with various embodiments of the present invention in which the gaming machine is connected to a local area network 215. Components that appear in gaming machine 100 of FIG. 1 are identified by common reference numerals. A master gaming controller 205 controls the operation of the various gaming devices and the game presentation on the gaming machine 200. Using a game code and graphic libraries stored on the gaming machine 200, the master gaming controller 205 generates a game presentation which is presented on the displays 134 and 142. The game presentation is typically a sequence of frames updated at a rate of 75 Hz (75 frames/sec). For instance, for a video slot game, the game presentation may include a sequence of frames of slot reels with a number of symbols in different positions. When the sequence of frames is presented, the slot reels appear to be spinning to a player playing a game on the gaming machine. The final game presentation frames in the sequence of the game presentation frames are the final position of the reels. Based upon the final position of the reels on the video display 134, a player is able to visually determine the outcome of the game.

Each frame in a sequence of frames in a game presentation is temporarily stored in a video memory located on the master gaming controller 205 or alternatively on the video controller 230. The gaming machine 200 may also include a video card (not shown) with a separate memory and processor for performing graphic functions on the gaming machine 200. Typically, the video memory includes one or more frame buffers that store frame data that are sent by the video controller 230 to the display 134 or the display 142.

The frame data stored in the frame buffer provide pixel data (image data) specifying the pixels displayed on the display screen. The master gaming controller 205, according to the game code, may generate each frame in one of the frame buffers by updating the graphical components of the previous frame stored in the buffer. In a similar manner, the master gaming controller 205 may generate audio components that are output to a speaker 114 using the sound controller 232.

The video and audio components of a game presentation, as well as the configuration of the gaming machine during game play, may be affected by game components stored on a smart card or by gaming instructions generated by applications executing on the smart card. Game graphic components and game sound components may be downloaded from memory on the smart card via the smart card reader 124. For instance, images stored on the smart card, in a graphics format such as MPEG, may include player-specific images. Sounds stored on the smart card, in a sound format such as MP-3, may include, for example, one or more of a player's favorite songs.

The graphical and sound oriented game components may be incorporated into a game presentation on the gaming machine 200 and presented to the player using the displays, 134 and 142 and the speaker 114. Game component information from the smart card may be stored in RAM memory on the master gaming controller 205, may be stored in a smart card data partition 225 of a hard drive 220, may be store in a non-volatile memory 235 or may be stored in some other memory location on the gaming machine. The game components used in the game presentation may be preloaded into the smart card at the time the player receives their smart card or may be downloaded to the card from a remote location while the smart card is in use at the gaming machine 200.

Alternatively, game configuration parameters and denomination selection parameters may be loaded on the smart card at the time the smart card is issued. The initial parameters on the smart card may be set by the casino or may be defined by the player. During game play, a player may insert their smart card into the gaming machine 200 using the smart card reader 124. After the smart card is inserted into the smart card reader 124, the smart card reader 124 may transfer game configuration parameters and denomination selection parameters to the master gaming controller 205 via the main communication board 210. Then, based on the configuration parameters stored on the smart card and downloaded to the gaming machine, certain game types, such as card games, spinning reel games, test games available only on certain gaming machines, or other specialty game types available on the gaming machine 200 may be displayed while other games available on the same gaming machine may not be displayed. To initiate game play on the gaming machine, the player may first select from among a number of displayed games available on the gaming machine.

While the player is playing one or more games on a particular gaming machine, a smart card inserted into the smart card reader 124 may regularly communicate with the gaming machine 200. For instance, while the smart card is inserted into the smart card reader 124, the smart card may receive regular updates of game play history information, such as money accepted into the gaming machine via the bill validator 130 and coin acceptor 128 or an amount wagered on a particular game, from the master gaming controller 205 on the gaming machine 200. The game play history information sent by the master gaming controller may be used to update game play history information stored on the smart card by one or more gaming applications executed on the smart card, such as the bonus game application, the voucher application, the paytable application and the progressive game application.

A smart card inserted into a smart card reader 124 may communicate with a master gaming controller 225 using communication protocols unique to smart cards, may use communication protocols common to gaming machines or combinations of both. For instance, a smart card may communicate with the gaming machine 200 using a Slot Accounting System (SAS) protocol or a Netplex communication protocol developed by IGT (Reno, Nev.). When a smart card is inserted into a gaming machine 200, the smart card may establish communications with the gaming machine in some standard communication protocol used by both the gaming machine 200 and the smart card. Then, the smart card may send the gaming machine a list of gaming applications and communication protocols supported by the smart card which may be used in a game play sequence on the gaming machine. Further, the gaming machine may send the smart card gaming machine identification information such as gaming machine serial number which may be used by the smart card to determine what gaming applications and communication protocols are supported by the gaming machine.

The smart card may communicate with other devices other than the gaming machine when inserted into the smart card reader 124. For example, via the main communication board 210 on the gaming machine, the smart card may communicate with one or more game service servers, such as server 245 and 250, connected to the gaming machine 200 via a LAN 215. The game service servers may provide one or more game services such as an accounting server, a bonus game server, a progressive game server, a player tracking server and a cashless system server. In addition, the smart card may communicate with devices in communication with the gaming machine via a wide area network such as the Internet 255.

By communicating with remote servers connected to a gaming machine, a smart card may augment the services provided by these remote servers in a distributed manner. For instance, player tracking services are usually only provided to gaming machines connected in a dedicated network to a player tracking server. Using the smart card, a player may engage in game play sequences on a plurality of gaming machine that are not connected to the dedicated communication network of a player tracking server and then engage in a game play sequence on a gaming machine connected to the player tracking server. When the smart card is inserted into a smart card reader on the gaming machine connected to the player tracking server, the smart card may contact the player tracking server and send game play information to the player tracking server about game play recorded on the smart card from game play sequences on gaming machines not connected to the player tracking server. The game play recorded the smart card may be obtained using player tracking gaming instructions generated by a player tracking gaming application executed on the smart card. Thus, with the smart card, player tracking services may be extended to gaming machines not connected to the player tracking server. In a similar manner, using a smart card, other gaming services provided by a game service server may be extended to gaming machines not connected to the game service server.

The smart card may communicate with the gaming machine 200 via communication interfaces other than the smart card reader 124. For instance, a player may carry a portable wireless communication interface that accepts a smart card. Thus, the smart card inserted into the portable wireless communication interface may communicate with the gaming machine 200 using the wireless communication interface 240.

The functions of the smart card described above may be performed by other gaming devices. For instance, a player may carry a personal digital assistant (PDA) that executes gaming applications such as a bonus game application, a voucher application, a progressive game application and a paytable application. The PDA may communicate with the gaming machine via a wireless communication interface, such as 240. In the manner described above for the smart card, gaming applications executing on the PDA may generate gaming instructions containing information and commands to the gaming machine. The gaming instructions, from the PDA, may be executed by the gaming machine as part of a game play sequence on the gaming machine. There are many different types of PDAs from many different manufacturers. One example of a PDA that may be adapted for such use is the Palm VII from Palm, Inc., Santa Clara, Calif.

Specific embodiments of the present invention will now be described in which credits for playing a particular game or set of games are distributed and used to effect play of the designated game(s). These embodiments will be described with reference to a promotional card or device with which indicia of credit are associated. It should be noted that the promotional device may be any of a variety of devices including any of the instruments and mechanisms described above with reference to FIGS. 1 and 2 by which credit and other types of information may be communicated to a gaming machine.

Figure 4A:
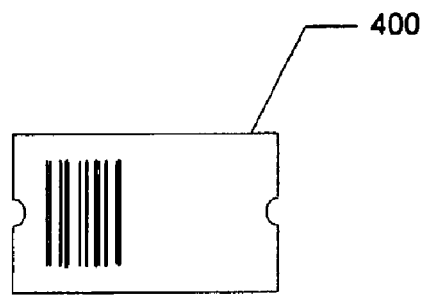
FIGS. 4A–4C show various exemplary embodiments of promotional devices according to the present invention.
Figure 4B:
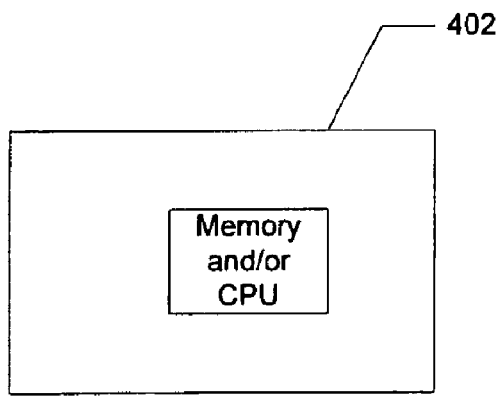
Figure 4C:
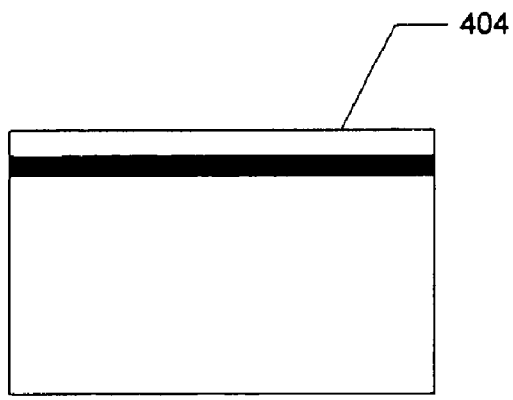

For example, a ticket voucher (e.g., ticket 120 of FIG. 1 or ticket 400 of FIG. 4A) printed by or for use with a gaming machine may have a bar code thereon which encodes a credit amount and identifies a specific gaming application or set of gaming applications for which the credit may be redeemed. Alternatively, the smart card described above an example 402 of which is shown in FIG. 4B) could have similar game-specific credit information stored directly on the smart card or have information on the smart card which points to the game-specific credit information on some remote storage device, e.g., servers 245 and 250 of FIG. 2 According to specific embodiments in which smart cards are used to distribute game-specific credits, the provider of the credits has the option of disabling certain system features for play associated with the game-specific credits. That is, for example, it might be desirable to disable player tracking functions (in which a player accrues points for playing games) when the game-specific credits are redeemed.

As yet another alternative, the game-specific credit information may be magnetically encoded in the magnetic strip of a promotional card (e.g., card 404 of FIG. 4G) which may be read by the gaming machine's card reader. According to a specific embodiment of the invention, such promotional cards include graphical elements on the cards which are specific to the game or games being promoted. These graphical elements may, for example, correspond to the graphical elements associated with the promoted game and are designed to generate interest in the promoted game. More generally, a wide variety of mechanisms are envisioned by which game-specific credits are distributed and used to enable operation of gaming machines. Therefore, the present invention should not be limited to the examples given.

Figure 3:
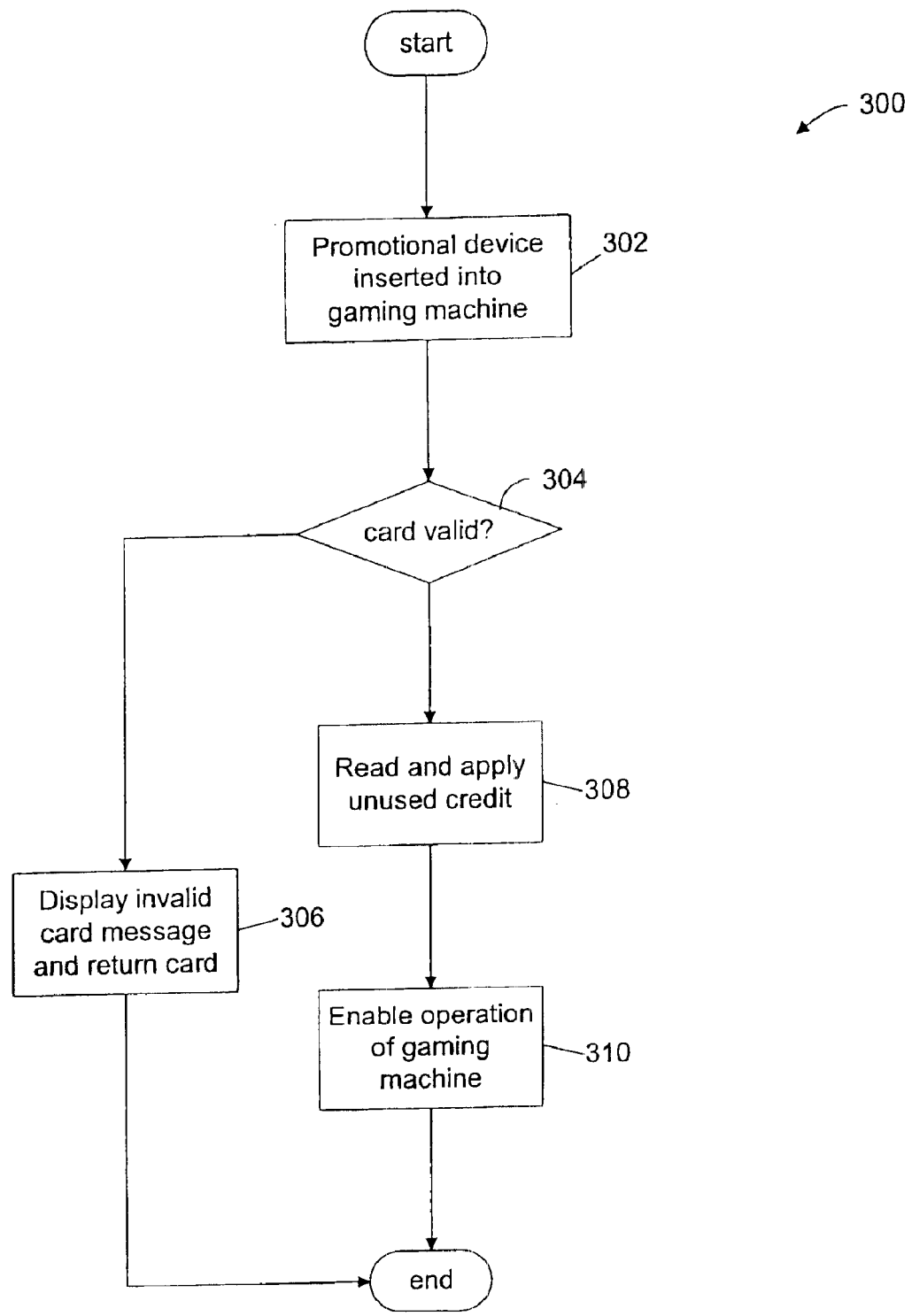
FIG. 3 is a flowchart illustrating redemption of game-specific credits according to a specific embodiment of the invention.

FIG. 3 is a flowchart illustrating redemption of game-specific credits according to a specific embodiment of the present invention. In this exemplary embodiment, the player has been provided with a promotional card having a magnetic strip which encodes information including some indicia of credit, e.g., $5, and identifying a specific game for which the credit may be redeemed. Such a card might be provided, for example, by a gaming establishment or gaming machine manufacturer for the purpose of promoting use of a newly deployed gaming machine. According to some embodiments, the encoded information associated with such a promotional card may identify multiple games for which the credit may be used. According to other embodiments, the encoded information may also indicate whether the credit for the game(s) identified may be used at a single gaming venue, or multiple venues associated with, for example, a chain of casinos associated with a particular operator.

Upon insertion of the promotional card into a gaming machine (302), it is determined whether the encoded information corresponds to a gaming application associated with the gaming machine and whether any credit is left (304). If not, the card is returned to the customer and an appropriate message is displayed which indicates that the inserted card is not valid for this machine (306).

If, on the other hand, the encoded information on the card identifies one or more gaming applications associated with the gaming machine and there is unused credit (304), the amount of credit indicated on the card is read (308) and operation of the designated gaming application in a manner which corresponds to the credit value is enabled (310). In embodiments where multiple games are associated with the gaming machine, operation of the gaming machine may be restricted only to those gaming application identified by the promotional card. In addition, the credit value associated with the card may be restricted to being used to effect play of the intended game. That is, it will not typically be redeemable for cash.

In embodiments in which a smart card (described above) is employed to implement the invention, the information on the smart card could identify both the promoted gaming application and the amount of the credit. Alternatively, the smart card could merely indicate that the player has a credit, additional information about which may be retrieved from a remote storage device. According to such an embodiment, the gaming machine would communicate with the remote storage device as described herein to effect the verification and crediting process described above with reference to FIG. 3.

According to some embodiments, the promotional card of the present invention may also be user-specific, including information identifying one or more persons authorized to redeem the credits. In such embodiments, the user may be verified with reference to the user's information on a debit card or a smart card. Alternatively, the user could be required to enter an authorization code associated with the promotional card.

In addition, and as described above, functions typically enabled by use of such a smart card may be disabled for game play associated with the redeemed credits. That is, the gaming venue may not desire to provide free use of a new gaming machine while simultaneously allowing the player to accrue points in the manner described above. Alternatively, the player tracking services could be altered to track play corresponding to the redeemed credits for tracking or other purposes.

While the invention has been particularly shown and described with reference to specific embodiments thereof, it will be understood by those skilled in the art that changes in the form and details of the disclosed embodiments may be made without departing from the spirit or scope of the invention. For example, specific embodiments of the invention have been described with reference to a gaming machine in which the various components of an associated gaming application are stored in the gaming machine itself. It will be understood, however, that the present invention may be implemented in distributed gaming environments in which the various objects associated with a gaming application may be stored in a variety of locations on a local or wide area network (e.g., the gaming machine and a remote gaming server) and/or shared among more than one gaming application.

It will also be understood that, according to some embodiments, use of the promotional devices embodied by the present invention may be restricted or expanded in a variety of ways. For example and as described above, a promotional device designed according to the invention may identify more than one game to which its credit may be applied, e.g., games provided by the same manufacturer. It should also be understood that the use of such a promotional device may additionally be limited to a single gaming establishment property or expanded to multiple properties in a chain or a particular geographic region. Management of promotional devices across multiple properties may be accomplished according to techniques described in commonly assigned, copending U.S. patent application Ser. No. 09/648,382 for CASHLESS TRANSACTION CLEARINGHOUSE filed on Aug. 25, 2000, the entire disclosure of which is incorporated herein by reference for all purposes.

According to still other embodiments, the information associated with a promotional device designed according to the invention need not be conveyed to the gaming system by insertion of the promotional device into a gaming machine. For example, information printed on a promotional ticket or card may be manually input into the system by the holder using any conventional type of user interface, e.g., a keypad or touch screen. Such a device may be useful where, for example, the gaming system is an Internet gaming system in which players participate using, for example, personal computers. In such an embodiment, the holder of the promotional card or ticket could input a string of alphanumeric characters associated with the card using his keyboard, in response to which a specific amount would be credited to that player for use in playing a specific game or set of games, or for use at a particular gaming site or set of gaming sites, in much the same way as described above with reference to FIG. 3.

In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A promotional device having indicia of game-specific credit associated therewith for effecting operation of game code corresponding to a specific game on a gaming machine which is in communication with the promotional device, the promotional device having machine-readable information encoded therein which both identifies the indicia of game-specific credit and relates the game-specific credit to the specific game, the gaming machine being operable to employ the machine-readable information to identify the specific game and limit use of the game-specific credit thereto.

2. The promotional device of claim 1 further comprising visual elements on the promotional device representing the specific game.

3. The promotional device of claim 1 wherein the specific game comprises only one specific game.

4. The promotional device of claim 1 wherein the specific game comprises a plurality of specific games.

5. The promotional device of claim 1 wherein the promotional device comprises a printed ticket and wherein the indicia of credit comprises a bar code on the printed ticket.

6. The promotional device of claim 5 wherein the bar code also identifies the specific game.

7. The promotional device of claim 1 wherein the promotional device comprises a card having magnetic information stored therein which includes the indicia of credit.

8. The promotional device of claim 7 wherein the magnetic information also identifies the specific game.

9. The promotional device of claim 1 wherein the promotional device comprises a card having a memory embedded therein which stores information corresponding to the indicia of credit.

10. The promotional device of claim 9 wherein the information identifies the specific game.

11. The promotional device of claim 9 wherein the identifies a user to which the card and the credit corresponds.

12. The promotional device of claim 1 wherein the gaming machine is part of a gaming network which includes a remote storage device, at least part of the indicia of credit being stored in the remote storage device.

13. The promotional device of claim 12 wherein the promotional device identifies a user, the part of the indicia of credit stored in the remote storage device being associated with the user.

14. The promotional device of claim 1 further configured to identify an individual authorized to redeem the credit.

15. The promotional device of claim 1 wherein the promotional device is configured to be inserted into the gaming machine to facilitate communication with the gaming machine.

16. The promotional device of claim 1 wherein the promotional device further comprises a wireless transmitter for communicating with the gaming machine.

17. The promotional device of claim 1 further configured to identify at least one gaming venue in which the promotional device may be employed.

18. The promotional device of claim 17 wherein the at least one gaming venue comprises multiple related gaming venues.

19. A gaming machine, comprising:
   circuitry for receiving machine-readable encoded information from a promotional device having indicia of game-specific credit associated therewith for effecting operation of a specific game, the encoded information both identifying the indicia of game-specific credit and relating the game-specific credit to the specific game; and
   a processor configured to identify the specific game with reference to the encoded information and determine whether game code corresponding to the specific game is associated with the gaming machine, and, where the game code corresponding to the specific game is associated with the gaming machine, enable operation of only the specific game in accordance with the credit.

20. The gaming machine of claim 19 wherein the gaming machine is part of a gaming network which includes a remote storage device, at least part of the indicia of credit being stored in the remote storage device.

21. The gaming machine of claim 20 wherein the encoded information identifies a user, the part of the indicia of credit stored in the remote storage device being associated with the user.

22. The gaming machine of claim 19 wherein the circuitry comprises one of a magnetic card reader, a bar code reader, and a wireless receiver.

23. A computer-implemented method for operating a gaming machine, comprising:
   communicating with a promotional device having indicia of game-specific credit associated therewith for effecting operation of a specific game, the promotional device having machine-readable information encoded therein both identifying the indicia of game-specific credit and relating the game-specific credit to the specific game;

identifying the specific game with reference to encoded information;

determining whether game code corresponding to the specific game is associated with the gaming machine;

where the game code corresponding to the specific game is associated with the gaming machine, enabling operation of only the specific game using the gaming machine in accordance with the credit.

24. The method of claim 23 wherein the gaming machine is part of a gaming network having at least one gaming server associated therewith, and wherein enabling operation of the game code corresponding to the specific game comprises employing objects associated with the game code distributed among the gaming machine and the at least one gaming server.

25. The method of claim 24 wherein the network is one of a local area network and a wide area network.

26. The method of claim 23 wherein the gaming machine is a stand-alone device.

27. The method of claim 23 further comprising identifying a specific user associated with the promotional device.

28. The method of claim 27 further comprising altering a service associated with the specific user for operation of the specific game in accordance with the credit.

29. The method of claim 28 wherein altering the service comprises disabling a player tracking service.

30. The method of claim 27 further comprising verifying the promotional device is being used by the specific user.

31. The method of claim 30 wherein verifying the promotional device is being used by the specific user comprises receiving an authorization code.

32. The method of claim 30 wherein verifying the promotional device is being used by the specific user comprises receiving user information from a source other than the promotional card.

33. The method of claim 32 wherein the source comprises a player tracking card.

34. The method of claim 23 wherein communicating with the promotional device comprises receiving the promotional device in a receptacle associated with the gaming machine.

35. The method of claim 23 wherein communicating with the promotional device comprises receiving a wireless transmission from the promotional device.

36. The method of claim 23 further comprising identifying at least one gaming venue in which the promotional device may be employed.

37. The method of claim 36 wherein the at least one gaming venue comprises multiple related gaming venues.

* * * * *